United States Patent [19]
Kleiner

[11] Patent Number: 4,490,283
[45] Date of Patent: Dec. 25, 1984

[54] FLAME RETARDANT THERMOPLASTIC MOLDING COMPOUNDS OF HIGH ELECTROCONDUCTIVITY

[75] Inventor: Lothar W. Kleiner, Mentor, Ohio

[73] Assignee: Mitech Corporation, Willoughby, Ohio

[21] Appl. No.: 332,000

[22] Filed: Dec. 18, 1981

Related U.S. Application Data

[63] Continuation-in-part of Ser. No. 238,757, Feb. 27, 1981, abandoned.

[51] Int. Cl.$^3$ .............................................. H01B 1/02
[52] U.S. Cl. ...................................... 252/512; 252/513; 252/518; 264/104; 524/439; 524/440; 524/441
[58] Field of Search ............... 252/512, 518, 513, 511; 524/439, 440, 441; 264/104, 45.1, 125

[56] References Cited

U.S. PATENT DOCUMENTS

| | | | |
|---|---|---|---|
| 2,761,854 | 9/1956 | Coler | 260/38 |
| 3,003,975 | 10/1961 | Louis | 252/503 |
| 3,491,056 | 1/1970 | Saunders et al. | 260/41 |
| 3,708,387 | 1/1973 | Turner et al. | 161/168 |
| 3,709,835 | 1/1973 | Forster | 252/513 |
| 3,867,315 | 2/1975 | Tigner et al. | 252/512 |
| 3,919,122 | 11/1975 | Tigner | 252/512 |
| 3,978,378 | 8/1976 | Tigner et al. | 317/258 |
| 4,151,132 | 4/1979 | Khanna | 252/511 |
| 4,228,050 | 10/1980 | Martin et al. | 260/23 XA |
| 4,241,120 | 12/1980 | Datta et al. | 428/65 |

FOREIGN PATENT DOCUMENTS

| | | |
|---|---|---|
| 38679 | 10/1981 | European Pat. Off. . |
| 2007364 | 1/1970 | France . |
| 2385766 | 10/1978 | France . |
| 45057 | 11/1977 | Israel . |

OTHER PUBLICATIONS

Journal of Applied Polymer Science, vol. 20, pp. 2575–2580 (1976) by Mukhopadhyay et al.
Polymer Engineering and Science, vol. 19, pp. 533–544 (1979) by Bhattacharyya et al.
Composites, vol. 10, No. 2, pp. 95–100 (Apr., 1979) by Bigg.
Polymer Engineering and Science, vol. 17, pp. 842–847, (1977) by Bigg.
Technical Papers, vol. XXV, pp. 762–765 (Bodnar et al.), Published by Society of Plastics Engineers Annual Technical Conference, May 1979.
Technical Papers, vol. XXV, pp. 766–770 (Woodham et al.), Published by Society of Plastics Engineers for Annual Technical Conference, May 1979.

*Primary Examiner*—Josephine L. Barr
*Attorney, Agent, or Firm*—John P. Hazzard

[57] ABSTRACT

Flame retardant, conductive plastic molding compositions are provided in granular form comprising a thermoplastic resinous matrix through which are distributed fine, solid anisometrically shaped metallic particles in amounts totalling between about 12% and about 40% by volume. The formulation of said matrix is such that it contains at least about 24% by weight of chlorine derived primarily from vinyl chloride resins having K values between about 45 and about 70, and it also contains from about 3% to about 15% by weight of balanced lubricant/stabilizer combinations. Said anisometrically shaped metallic particles typically have aspect ratios of over about 10 to 1 and a minimum characteristic dimension of over 1 micron and are preferably composed almost entirely of conductive metal.

16 Claims, No Drawings

FLAME RETARDANT THERMOPLASTIC MOLDING COMPOUNDS OF HIGH ELECTROCONDUCTIVITY

This application is a continuation in part of copending U.S. application Ser. No. 238,757 filed Feb. 27, 1981, which application is now abandoned.

This invention is directed to metal-filled thermoplastic compositions which can be quickly fabricated by simple, elevated temperature molding techniques into structurally sound rigid articles which are both flame retardant and electrically conductive.

BACKGROUND OF THE INVENTION

Conductive plastic compositions have been well received as desirable raw materials for the fabrication of a variety of specialized accessories and components including static electricity dissipation devices, electrical heating elements, equipment parts for high frequency protection and/or electromagnetic interference (EMI) shielding, and a variety of other electrical components such as electrodes, terminals, connectors and the like.

Thermosetting or heat-curable polymer systems have been most prominent in the majority of such conductive plastics materials which have been developed so far. For certain electrical applications, the resistance of many thermosetting materials to high temperature service conditions is a major consideration. However, a more generally important factor probably resides in the inherent reactivity responsible for their thermosetting character which also tends to encourage polymeric interaction with finely subdivided, conductive solids (e.g., metallic powders, carbon blacks and the like) that are incorporated into the polymeric base material in order to provide appropriate levels of conductivity.

Most thermoplastic resins on the other hand are considerably less responsive to additions of finely divided solid fillers so that actual deterioration of many structurally significant physical properties usually occurs when they are filled with carbon blacks, powdered metals and the like in amounts required to provide practical levels of electroconductivity. Such deficiencies have severely limited applications accessed by conductive thermoplastic compositions, largely confining them thus far to the fabrication of partly supported auxiliary elements or secondary components like seals, gaskets, inserts and electrodes, rather than primary structural members.

In spite of such difficulties, filled thermoplastic systems have, of course, continued to receive considerable attention since rigid thermoplastic resins offer definite advantages over most thermosetting materials in regard to ease of handling, melt processing convenience and simplicity of fabricating finished articles therefrom by usual high speed plastic forming techniques such as extrusion, molding and the like. Indicative of approaches which have been taken in an effort to develop metal-filled thermoplastic compositions with improved overall performance and utility are those disclosed in the publications summarized below.

U.S. Pat. No. 3,491,056 to Saunders et al discloses the rare ability of finely divided aluminum powder to strengthen a specialty thermoplastic resin derived from a prescribed copolymerization of ethylene with an unsaturated carboxylic acid such as acrylic acid. It appears, however, that outstanding levels of electrical conductivity were not achieved in this system even with a 50% by volume loading of conductive filler unless some of the fine aluminum powder was replaced with carbon black (e.g., 16% by volume as in Example 7).

U.S. Pat. No. 3,867,315 to Tigner et al is much more concerned with achieving good electrical conductivity levels without excessive volume loadings of the particular metallic filler material. This is accomplished by including various ionic metal salts along with the metallic filler, which is either copper or contains accessible copper. A broad list of thermoplastic resins is recited, but experimental data is presented only for a blend of 2 parts polyethylene with 1 part of 72/28 copolymer of ethylene and vinyl acetate and no physical strength properties whatsoever are indicated. A closely related patent is U.S. Pat. No. 3,919,122 to Tigner which deals with substantially the same system except that the ionic salt is a metal halide salt which is formed in situ from free metal and a suitable halide source. The preferred halide source is a halogen-containing polymer (notably one derived from vinylidene chloride), with a copolymer of vinyl chloride and vinylidene chloride in respective weight proportions of 27:73 being used in most of the illustrative examples. However, the only metallic filler used in said examples is a brass powder with an average particle size of 5 to 12 microns and, again, no physical strength measurements are presented.

Another approach to achieving highly conductive metal-filled plastic composites at very low volume loadings of the metallic filler has been resorted to from time to time in this art. The basis of this approach, which is often referred to as the "segregated metal particle network" technique, is the careful observance of several critical processing conditions in fashioning the finished composite. These conditions generally include dry mixing of rather large granules of organic polymer with much smaller particles of metal and compacting the resulting mixture under pressures and temperatures controlled to cause some coalescence or sintering between neighboring polymeric granules without effecting sufficient melt flow to result in extensive intermingling with the network of fine metallic particles distributed therebetween. By means of such techniques, highly conductive, compacted metal-polymer composites can be obtained at metal filler loadings below about 10% by volume, due to the resulting preferential segregation of metal particles into extended chain-like networks which apparently serve as a system of three-dimensionally interconnected pathways through which current can flow. Patents describing products made by such techniques include U.S. Pat. No. 2,761,845 to Coler and U.S. Pat. No. 3,708,387 to Turner et al. Additional descriptions are also found in the basic research literature including such recent journal articles as:

Journal of Applied Polymer Science 20, pp. 2575-2580 (1976) by Mukhopadhyay et al and Polymer Engineering and Science 19, pp. 533-544 (1979) by Bhattacharyya et al.

Unfortunately, industrial applications for said products appear to be extremely limited since the associated techniques are totally abhorrent to the high speed, "molten state" mixing and molding operations for which thermoplastic are so well suited and for which reason they are usually selected in commercial practice. Furthermore, in view of the inherent heterogeneous nature of such "segregated network" metal-polymer compacts, it is very doubtful in any case that adequate manufacturing uniformity and reproducibility could be achieved for commercial articles except possibly those of the simplest shape and design and least demanding fields of application.

In view of the apparent state of this art, a considerable need continues to exist for improved and more versatile metal-filled polymeric compositions. In particular, a clear need is sensed for such compositions which are not only derived from a thermoplastic resinous matrix but which can also be economically and conveniently prepared and safely processed and dependably fabricated by conventional high speed techniques into a wide variety of shaped articles having both good conductivity and sound physical integrity. One of the most challenging raw material requirements in this field resides in the need for conductive thermoplastic molding compounds suitable for forming flame retardant structural members of sufficient size, mass and complexity to serve as electronic equipment housings, dampers and/or shields for absorbing or blocking out electromagnetic field effects or other high frequency electrical emissions.

Accordingly, the primary goal of the present invention is the provision of a family of flame retardant, thermoplastic molding compounds of high electroconductivity which can be readily shaped even by fast cycle molding techniques to form rigid articles having well balanced all around physical properties and adequate structural stability for many diversified electric conducting specialty applications. A more specific objective of my invention is to formulate flame retardant, thermoplastic molding compounds the ingredients and composition of which are further restricted and optimized so that exceptional levels of electroconductivity as well as outstanding overall physical properties are attained in articles molded therefrom. Such optimized molding compounds are particularly needed for certain specialized structural uses, such as EMI shielding members, electronic equipment housings and the like, and thus represent a preferred embodiment of the present invention.

SUMMARY OF THE INVENTION

In accordance with the present invention, metal-filled, flame retardant thermoplastic molding compositions of high electroconductivity and meeting the overall objectives and criteria set forth above are provided in the form of coarse granules or pellets containing within a coherent, cementitious matrix from about 12% to about 40% by volume of solid, metallic particles of strongly anisometric shape (i.e., having at least one aspect ratio of over 10/1) with the smallest characteristic linear dimension having an average value of at least about 1 but not over about 100 microns. These anisometric, metallic particles are well dispersed within said coherent cementitious matrix which is composed predominantly of thermoplastic resins not substantially less than about half by weight of which are vinyl chloride polymers (or copolymers) containing not less than about 80 weight percent of vinyl chloride units therein and having K values between about 45 and about 70. In addition, for insured melt processability and ease of incorporating said metallic particles therein, said cementitious matrix should include as essential additives from about 3% to about 15% by weight of a well balanced combination of lubricants which are solid at temperatures up to at least 50° C., together with effective stabilizers, said combination including not substantially less than 1% by weight of waxy lubricants, at least about 1% by weight of fatty acids salts of magnesium, lithium and/or alkaline earth metals and at least about 1% by weight of stabilizer compounds of metals selected from Group IVA and VA of the Periodic Table of elements.

Said matrix may also contain various optional additives compatible with the polymeric vinyl chloride base thereof. These optional additives include minor ingredients of the type normally used in very low concentrations, e.g., of the order of only 1 or 2%, such as liquid plasticizers and lubricants, dyes or pigments and various stabilization synergists, as well as a few auxiliary materials which may be incorporated in larger proportions, e.g., nonconductive, substantially inert solid fillers such as calcium carbonates, clays, etc., the total content of which is usually no more than about 5% by weight but can go as high as about 8% in some cases. However, the most significant of the optional additives are various solid polymeric adjuvants blendable with rigid vinyl chloride resins to modify properties such as processibility, toughness and/or high temperature strength, etc., the total amount of which most typically would equal between about 5 and about 35% by weight but may occasionally be as high as about 50% by weight of the cementitious matrix, provided that the total chlorine content of said matrix is not reduced below about 24% by weight. The most advantageous of these various polymeric adjuvants are those generally classified as impact modifiers. Wide variations are possible in the chemical constitution of said polymeric impact modifiers, but they most often exhibit a fundamentally hybrid character reflecting the presence thereof of segments or blocks varying significantly in compatibility with rigid vinyl chloride resins. Thus, effective polymeric adjuvants for this purpose are typically sufficiently compatible with the vinyl chloride resins to flux readily therewith under normal melt blending conditions but not to the point of total single-phase miscibility. Preferably, they are either copolymer products (including especially those obtained by a so-called graft polymerization process in the presence of preformed rubber) or chlorinated linear polyethylenes containing between about 25% and about 50% by weight of chlorine.

DETAILED DESCRIPTION AND PREFERRED EMBODIMENTS

The rigid vinyl chloride resins which serve as the basic and principal component of the cementitious matrix of the molding compounds hereof may be homopolymers and/or copolymers containing not more than 20% by weight of suitable comonomers and having K values between about 45 and about 70, and preferably between about 50 and about 60. These values correspond approximately to the lower to intermediate molecular weight range of such rigid resins, i.e., those not over about 110,000 in weight-average molecular weight and preferably below about 85,000. The best known of the suitable comonomers are vinylidene chloride, alpha-olefinic hydrocarbons like ethylene, propylene, etc., vinyl esters such as vinyl acetate, vinyl aromatics such as styrene, acrylic acids and their derivatives (e.g., ethyl acrylate, acrylamide or acrylonitrile) and vinyl heterocyclics like vinyl pyridine. The most preferred of said base resins are those with K values between about 50 and about 60 and which contain at least about 85% by weight of vinyl chloride.

The metallic particles used in the present invention may vary significantly in basic geometric form provided that they have required aspect ratios and minimum dimensions. Thus, they should be sufficiently lamellar and/or elongated to provide balanced aspect ratios favorable to both conductivity and processibility, namely more than about 10 to 1 but not over about 200 to 1, and preferably between about 20 to 1 and about 100 to 1. The term "aspect ratio" is used herein in the normal sense, i.e., to denote the ratio of the maximum characteristic axial dimension (generally referred to as "length") to the shortest representative dimension (usually called "thickness"). The third characteristic dimension of solid particles (most typically referred to as "breadth" or "width") will in the present case most often be somewhere in between the other two but can sometimes be substantially equal either to the smallest dimension (as in highly columnar or nearly cylindrical shapes) or to the largest dimension (e.g., as in substantially square or nearly circular flakes or wafers). In any case, the metallic powders used herein obviously represent a drastic departure from the chunky-bodied particles commonly found in most powdered solids which, whether basically globular, cuboid or tetrahedral in geometric form, are seldom characterized by aspect ratios much greater than about 5 to 1.

In the above-prescribed shapes, most solid, metallic particles which are sized with a shortest characteristic dimension ("thickness") of between about 1 micron and about 100 microns are readily processed and incorporated at the levels needed to provide finished thermoplastic compositions of excellent electroconductivity. For best overall performance in terms of both processibility and conductivity, the ideal characteristic thickness dimension will fall between about 5 and about 50 microns, especially for particle shapes within the higher range of aspect ratios (e.g., those over about 100 to 1).

Although solid metal particles are preferred as the conductive filler herein, suitable nonmetallic substrates which have been coated over a substantial portion (e.g., about half or more) of their surface with a coherent layer of solid metal (to give metal contents of about 5 to about 60% of the total weight of the metal-coated particle) are also satisfactory. The best nonmetallic substrates are generally composed of inorganic matter such as glass or convenient raw materials such as graphite and/or minerals of naturally anisometric form, such as various silicates. However, some durable polymeric materials and organic fibers can also serve as substrates. The metallic portion of said particles can be composed of any electrically conductive metals or alloys which do not melt under conditions used in incorporating them into the thermoplastic composition and fabricating finished articles therefrom (i.e., temperatures up to about 225° C.). Preferably, one or more of aluminum, copper, magnesium, chromium, tin, nickel, iron and/or titanium will constitute more than 50% by weight of the total metal content, with the sub-group consisting of aluminum, copper, nickel and titanium being considered as the most preferred metals. In addition to physical mixtures and true alloys such as stainless steels, bronzes and the like, a few intermetallic chemical compounds (including borides, carbides, etc.) of these metals, e.g., titanium diboride, can also serve as metallic constituents of the conductive filler particles herein.

Regardless of the exact size, shape and composition of said metallic filler particles, they should be thoroughly dispersed through the cementitious matrix at volume loadings of between about 12% and about 40% based on the finished thermoplastic molding composition in order to achieve a good balance of overall properties. For metallic particles of the most preferred size and shape, i.e., minimum dimension (or thickness) of between about 5 and about 50 microns and aspect ratio of between about 20 to 1 and about 100 to 1, the best balance of overall properties is usually achieved at volume loadings of metal filler of between about 15% and about 35%.

In addition to the use of the specified class of anisometric, finely divided metallic fillers, and the base vinyl chloride resins of lower to intermediate K value and/or molecular weight as particularly described hereinabove, it is also essential to include in the resinous matrix of the present compositions a well balanced and highly effective stabilizer/lubricant system of additives in order to enable thorough incorporation of said metallic filler to be effected with ease and safety and to assure adequate processibility and stability in the filled thermoplastic compositions thus produced. Said stabilizer/lubricant system includes at least one material from at least three different classes of additives as follows:

(1) Waxy lubricants having melting points above 50° C.—Included in this class are (a) naturally occurring waxes such as paraffin waxes extracted from petroleum and the montan waxes extracted from lignite or peat; (b) synthetic waxes obtained principally from mineral source raw materials, e.g., low molecular weight polymers of ethylene (some of which may be partly oxidized) and esters of the montanic acids ($C_{26}$ to $C_{32}$ monocarboxylic aliphatic acids) including, e.g., diesters of same with polyfunctional alcohols; and (c) amide or ester type waxes of various fatty acids or mixed fatty acids (including those derived from vegetable oils or animal fats) of which the bis-amides (e.g., ethylene-bis-stearamide) and the triglyceride esters (e.g., hydrogenated castor oil) are of special importance.

(2) Fatty acid salts of magnesium, lithium and/or alkaline earth metals (like calcium, strontium and barium)—These may be primarily composed of a given metal soap such as calcium stearate, or of mixed salts of two or more metals (at least one of which is from this group) with a given fatty acid or with mixed fatty acids containing between about 12 and about 24 carbon atoms.

(3) Stabilizing compounds of Group IVA or VA metals—These are primarily derived from tin, lead or antimony and include their soaps, e.g., stearates or octoates, and some other familiar organic salts, e.g., phenolates or maleates. In fact, many different inorganic as well as organic salts of lead are satisfactory, such as sulfates, silicates, phosphites, etc., and phthalates. Basic forms of such lead salts (i.e., those with empirical formulae reflecting the presence of some PbO) are generally preferred. Specific examples include tribasic lead sulfate and dibasic lead stearate. The tin and antimony compounds of primary interest on the other hand are mostly organometallic types such as the well-known dialkyl tin compounds, including, e.g., dibutyl or dioctyl tin mercaptides or maleates and the like, and various antimony mercaptides or mercapto derivatives such as antimony trilauryl mercaptide, antimony triisooctylthioglycolate or butyl antimony dilauryl mercaptide.

Although not necessary for providing electroconductive, flame retardant thermoplastic molding compositions with adequate physical properties for general use, the potential roles in the present invention of several optional supplemental components need to be explored and discussed more fully in order to assure a full understanding of certain more limited embodiments or refined modifications which might be especially advantageous for particular purposes. As already indicated, the most advantageous of the optional ingredients and the most important from the point of being beneficial in relatively large amounts are the polymeric modifiers. These include many different types of essentially thermoplastic resins but are generally limited to those with reasonably good compatibility and at least gross miscibility with rigid vinyl chloride resins.

The most important of these optional polymeric modifiers are those capable of improving impact strength of the thermoplastic resin based molding compositions. For demanding structural applications, the inclusion of such impact modifiers in amounts of from about 5% to about 20% by weight of the total cementitious matrix is highly recommended. In fact, even higher amounts of certain well balanced impact modifiers can be used, e.g., up to about 40% by weight or more of said matrix provided they do not significantly diminish other desirable properties of the finished products such as their processibility and high temperature strength. The preferred impact modifiers herein are the hybrid elastomeric/plastomeric copolymer products formed by graft type polymerization of one or more suitable monomers from families such as the vinyl aromatics, acrylate monomers and/or acrylonitriles with a preformed rubbery backbone or elastomeric trunk polymer, particularly the well-known butadiene-containing rubbers but also including more nearly saturated elastomers (e.g., the polyalphaolefin and polyacrylate types). Other nongrafted polymeric impact modifiers, such as ethylene-vinyl acetate copolymers and chlorinated polyethylenes, can also sometimes be used in appropriate amounts herein, either alone or together or in combinations with certain graft-copolymer impact modifiers.

Other polymeric modifiers of interest are generally wholly rigid thermoplastic resins which are readily miscible with the vinyl chloride base resin. These may be added to improve melt flow and/or processibility of the molding composition and/or to improve high temperature properties, and include post-chlorinated vinyl chloride resins as well as a wide variety of low to high molecular weight miscible copolymers, such as those of methyl methacrylate with ethyl acrylate and/or of acrylonitrile with styrene and/or alpha-methyl styrene. When used, these wholly thermoplastic resins can be included at any reasonable level (e.g., from about 1% to about 40% by weight of the cementitious matrix), provided that the total amount of all the polymeric adjuvants is not substantially over about 50% by weight thereof and the total chlorine content of said matrix is not reduced below about 24% by weight.

Little additional comment is reqired regarding the remaining optional ingredients such as pigments, opacifiers, colorants, liquid lubricants or plasticizers, synergists or supplemental stabilizers, inert fillers and the like since they are used in very minor amounts for special effects and in accordance generally with well established practices. On the other hand, the total amounts of inert solid fillers and/or liquid components do need to be monitored and limited to levels which do not seriously impair either electroconductivity levels or the overall balance of desirable physical properties. Thus, to avoid problems of this nature, the total amount of liquid components should not exceed about 5% by weight of the total thermoplastic matrix and the combination of inert fillers and liquid components should not total much more than about 10% by weight thereof.

The preparation of the thermoplastic molding compositions of this invention can generally be accomplished by adaptively coordinated use of known types of mixing equipment to combine the various components thereof into a homogeneously blended mixture consisting of a fused, resin-based cementitious matrix through which the metallic anisometric particles are well dispersed with minimal damage thereto. Once achieved, this homogeneously blended dispersion of said metallic particles through a continuous, fused mass of said cementitious matrix can be readily converted to compact pellets or granules by usual plastic shaping and cooling techniques such as extrusion pelletizing, chopping, dicing, etc.

In order to prevent extensive fragmentation or breakage of the metallic filler particles during their incorporation and dispersion through said matrix, any dry blending operations for combining them with the matrix components should entail relatively mild or low speed agitation systems. Likewise, their ultimate thorough incorporation and dispersion through the matrix will generally be effected by a melt shearing and masticating step during which the resinous components reach the fused state and which is normally near the end of the overall mixing sequence. The characteristic slow speed kneading action of such a step enables said anisometric metallic particles to be dispersed thoroughly in the softened, viscous, plasticated matrix without extensive damage to their structural integrity. A variety of plasticating and melt shearing equipment is available for such use including essentially batch type mixing equipment such as Banbury and roll mills as well as essentially continuous mixers, such as kneaders and mixing extruders represented by both twin screw devices and certain double stage, single screw types.

Certain of the minor auxiliary components of the present compositions can be introduced at almost any step of the overall mixing sequence. For example, any substantially inert filler materials can easily be added either at the matrix premixing stage or along with said metallic filler particles during the melt plastication stage. By the same token, certain other minor additives might logically be introduced along with such fillers, such as wetting agents, adhesion promoters, dispersion aids and/or other processing aids. Even fine colorants or pigments like carbon blacks and $TiO_2$, especially in a predispersed masterbatch of same in a suitable carrier (e.g., a compatible resin) can sometimes be successfully incorporated at the late stages of the mixing sequence.

However, in the interest of overall production efficiency and economy, it is generally desirable to premix at least most of the matrix components, including especially such major ingredients as the rigid vinyl chloride base resin and the essential stabilizers and lubricants to form a homogeneous powder blend of substantially the full cementitious matrix before subjecting same to the melt shearing and plasticating step. At least the major portion of the more significant polymeric modifiers as well as most of any normally liquid ingredients are also generally included in such powder blend premixes.

A wide variety of blending devices known in the art are satisfactory for preparing powder blends from a combination of ingredients such as those comprising a typical cementitious matrix of the present molding compositions, i.e., a combination of ingredients having differing melting or softening points but most of which are solids at ordinary room temperatures. The most efficient of such devices are the high intensity, rotating blade types, including such commercially available makes as the Henschel Fluid Mixer, the Papenmeier Dry Mixer and the Welex Mixers. Due to the high intensity centrifugal action and turbulence of their rotating blades, these mixers can rapidly create a homogeneous powder blend of various particulate ingredients placed therein. A considerable amount of the kinetic energy of such mixers is simultaneously transferred to the ingredient materials as heat through the impacting and shearing performed thereon as well as resultant collisions and impingements within the particulate materials per se. Such frictional heating is usually beneficial up to a point, e.g., by softening or melting some waxes and/or other lower melting solids and assisting in their distribution through and assimilation by the other ingredients. However, the temperatures generated therein should not be allowed to rise sufficiently to cause fusion of major resin components such as the rigid vinyl chloride base resin. Although temperatures of 150° C. or more may be safely reached by the end of said powder blend premixing step with most combinations of interest herein, there is usually little or no incentive for employing temperatures quite so high, and it is preferred that said powder blend premixing be stopped when temperatures are still below 125° C., e.g., at levels in the general range of about 90° to about 120° C.

Such matrix component premixes can also be made by less intensive or lower speed powder blending techniques and equipment provided that minimizing the cycle time is not of paramount concern. Supplemental heat can be introduced in such cases, e.g., from an external source and/or by some preheating of the component ingredients, if desirable for expediting the attainment of a sufficiently homogeneous powder blend.

In order to provide a more complete understanding of the present invention and certain details involved in practicing same, the following specific examples are provided for illustrative purposes only and without any implication that the specific details disclosed are intended to represent limiting conditions therefor. In said examples, parts and percentages are by weight unless otherwise indicated.

EXAMPLE 1A

A premixed powder blend of matrix components employing a rigid PVC suspension type homopolymer with a K value of about 51 as the base resin was prepared in accordance with the following formulation in which the proportion of each ingredient used is given in parts per 100 parts by weight of said PVC.

| Ingredient | Weight Proportion Used |
| --- | --- |
| Tribasic Lead Sulfate | 5.0 |
| Lead Stearate | 1.0 |
| Calcium Stearate | 1.5 |
| Paraffinic Wax[1] | 1.5 |
| Solid Acrylic Resin Processing Aid[2] | 1.5 |
| MBS Graft Copolymer[3] | 20.8 |
| Rigid Thermoplastic Blending Resin[4] | 7.0 |

[1]Wax 1014 supplied by Boler Petroleum Co.
[2]Supplied by Rohm & Haas under the Trade Name of ACRYLOID K-125.
[3]A methyl methacrylate-styrene graft copolymer of a high diene content rubber, supplied by Rohm & Haas under the Trade Name ACRYLOID KM-611.
[4]A linear copolymer of acrylonitrile with a major proportion of vinyl aromatic comonomers (predominately alpha-methyl styrene), supplied by Borg Warner under the Trade Name BLENDEX 586.

The blending of said components was accomplished in a high intensity Papenmeier Mixer in the following manner. The stabilizer compounds containing lead were added to the PVC base resin at ambient temperature and mixed for a few minutes until the temperature reached about 60° C. The calcium stearate, the petroleum wax and the processing aid were charged next and additional mixing performed until the temperature reached about 82° C. Finally, after charging the remaining two polymeric modifiers, the high speed mixing process was continued for a few more minutes until the frictional heat generated had raised the temperature of the blended matrix components to about 104° C. The contents were then discharged and cooled, yielding a free flowing, homogeneous powder, hereinafter referred to as "Matrix Premix 1A."

EXAMPLE 2

This example describes the results of incorporating flaked particles of aluminum at various volume loadings in Matrix Premix 1A.

The aluminum particles employed were principally thin flakes of generally tabular structure and fairly uniform in characteristic linear dimensions with an average thickness of about 25 microns and lengths and widths averaging about 1250 and 1000 microns respectively (equivalent to an Aspect Ratio of about 50 to 1).

Thermoplastic molding compositions containing said aluminum flakes were prepared by combining same with Matrix Premix 1A in various proportions as follows:

|  | Parts by Weight: | | Volume % |
| --- | --- | --- | --- |
| Batch No. | Matrix 1A | Al Flakes | Metal |
| 2A | 300 | 33.3 | 5.5 |
| 2B | 300 | 75.0 | 11.2 |
| 2C | 300 | 128.6 | 18.0 |
| 2D | 300 | 200.0 | 25.5 |
| 2E | 250 | 250.0 | 34.0 |
| 2F | 200 | 300.0 | 43.5 |

After combining the respective materials in the amounts indicated, each batch was gently mixed at substantially ambient temperatures to distribute the metal flakes fairly well through the Matrix Premix powder. The entire dry blended mixture for each batch was then milled for 5 minutes (after banding) on a two-roll mill heated to at least about 166° C. so as to flux the resinous components and disperse the metal flakes throughout the cementitious matrix of each composition.

The finished metal filled compositions thus obtained were compression molded into ⅛" thick test specimens and tested for electrical and mechanical properties with the following results:

| Batch No. | Vol. % Metal | Elect. Resist. (ohm-cm) | Flex. Strgth. (psi) | Izod Impact Strgth. (Notched) (ft-lbs/in) | Heat Distort. Temp.* |
| --- | --- | --- | --- | --- | --- |
| 2A | 5.5 | >10$^6$ | — | 2.6 | 79° C. |
| 2B | 11.2 | >1000 | — | 1.9 | 80° C. |
| 2C | 18.0 | 0.23 | 8500 | 1.7 | 81° C. |
| 2D | 25.5 | 0.0015 | 8350 | 1.6 | 82° C. |
| 2E | 34.0 | 0.0014 | 6235 | 0.9 | — |

-continued

| Batch No. | Vol. % Metal | Elect. Resist. (ohm-cm) | Flex. Strgth. (psi) | Izod Impact Strgth. (Notched) (ft-lbs/in) | Heat Distort. Temp.* |
|---|---|---|---|---|---|
| 2F | 43.5 | 0.0014 | 5550 | 0.7 | — |

*Measured at 264° psi and 23° C.

Other finely flaked aluminum fillers of substantially different but still highly anisometric form were also combined with Matrix Premix 1A in similar fashion to make batches having metal contents in the range of 2C–2D above. These particular flaked aluminum particles were characterized by an aspect ratio of about 40 to 1 and a structure somewhat like tiny flat splinters with an overall form similar to the blade of a dagger or the flat head of an arrow. As indicated, supplemental batches of thermoplastic molding compositions like 2C and 2D above were made from each of two grades of these splinter-like, angularly flaked aluminum fillers, one of which had a characteristic length dimension of about 3000 microns and an average thickness of about 75 microns, while these respective characteristic dimensions of the other grade were each about one-third as great.

Tests of corresponding molded specimens from said supplemental batches indicated that the resulting products had substantially equivalent physical properties to original batches 2C and 2D, but were slightly higher in electrical resistivity though still excellent conductors.

EXAMPLE 3

The preparation of molding compositions corresponding to the formulations of original batches 2C and 2D of Example 2 was carried out in similar manner except that the final consolidation of the dry blended mixtures of tabular aluminum particles and Matrix Premix 1A into a metal-filled thermoplastic resin based cementitious matrix was carried out by plasticating shear mixing in a two-stage single screw extruder instead of by processing on a two-roll mill. The electrical and mechanical properties of the compression molded samples of the finished molding compositions were substantially as good as in Example 2.

EXAMPLE 4

Using substantially the same procedure as in Example 2 except that the two-roll mill was heated to about 190° C., a molding composition was prepared from a dry blend of 300 parts of Matrix Premix 1A with 175 parts of the highly tabular aluminum flakes (aspect ratio of about 50) as described in Example 2 and 25 parts of finely divided carbon black. Tests on specimens compression molded from the finished composition revealed the following properties:

| Electrical Resistivity | 0.02 ohm-cm |
| Flexural Strength | 8400 psi |
| Notched Izod Impact Strength | 0.6 ft. lbs./in. |

EXAMPLE 5

A premixed powder blend of matrix components was prepared as in Example 1A using the same formulation of ingredients except that the rigid PVC homopolymer used as the base resin this time was characterized by a K value of 67.5 instead of 51.

Molding compositions (4C and 4D) were then produced corresponding to the formulations of batches 2C and 2D respectively in Example 2 except that the premixed powder blend described in the preceding paragraph was employed in this case instead of Matrix Premix 1A. In addition, the two-roll mill used to effect the plasticating and shear mixing of the finished compositions was heated to about 177° C.

The mechanical and electrical properties measured on test specimens of said 4C and 4D compositions obtained by compression molding at about 166° C. are given in the following table:

| Batch No. | Vol. % Metal | Elect. Resist. (ohm-cm) | Flex. Strgth. (psi) | Izod Impact Strgth. (Notched) (ft-lbs/in) | Heat Distort. Temp. at 264 psi |
|---|---|---|---|---|---|
| 4C | 18.0 | 0.0072 | 8200 | 3.1 | 80° C. |
| 4D | 25.5 | 0.0028 | 6315 | 1.9 | 81° C. |

EXAMPLE 6

Using substantially the same procedure as in Example 2 except that the two-roll mill was heated to about 177° C., molding compositions were prepared from Matrix Premix 1A by combining same with several different powdered metals as shown in the following table:

| Batch No. | Parts of Matrix 1A | Proportion and Type of Powdered Metal Filler |
|---|---|---|
| 6A | 300 | 200 parts of Ball Milled Aluminum[5] |
| 6B | 175 | 425 parts of Flaked Nickel[6] |
| 6C | 200 | 300 parts of Ball Milled Copper[7] |

[5]Consisting of thin platelets of irregular shape averaging about 0.6 micron thick with characteristic main face dimensions of about 20 microns × 40 microns.
[6]Consisting mostly of thin platelets of varying shape plus some smaller fragments and nodular fines; characteristic face dimensions of about 15 microns × microns and average thickness of about 1.5 microns.
[7]Consisting of thin platelets of irregular shape averaging about 1 micron in thickness and about 20 microns × 50 microns in characteristic face dimensions.

Tests performed on compression molded specimens of the resultant finished compositions gave the following measurements:

| Batch No. | Electrical Resistivity (ohm-cm) | Flexural Strength (psi) | Izod Impact Strength (Notched) (ft. lbs./in.) |
|---|---|---|---|
| 6A | >10[6] | 7650 | 0.4 |
| 6B | 0.08 | — | — |
| 6C | 450 | 8000 | 0.6 |

EXAMPLE 7

Additional premixed powder blends of matrix components were prepared as in Example 1A using the same formulation of ingredients except that the 20.8 parts by weight of MBS Graft Copolymer therein were replaced:

(1) by 20.8 parts of a chlorinated polyethylene containing about 36% by weight of chlorine to give Matrix Premix No. 7M; and (2) by 20.8 parts of an ABS graft copolymer supplied by Borg Warner under the Trade Name BLENDEX 453 to yield Matrix Premix No. 7X.

Thermoplastic molding compositions containing the highly tabular aluminum filler with 50 to 1 aspect ratio of Example 2 were then prepared using the procedure described in said example to combine 200 part by weight loadings of said aluminum filler with 300 parts of:

(1) Matrix Premix 7M to produce molding composition 7M-D; and (2) Matrix Premix 7X to produce molding composition 7X-D.

Tests performed on compression molded specimens of said molding compositions gave the following results:

| Batch No. | Elect. Resist. (ohm-cm) | Flex. Strgth. (psi) | Izod Impact Strgth. (Notched) (ft-lbs/in) | Heat Distort. Temp. at 264 psi |
|---|---|---|---|---|
| 7M-D | 0.003 | 11800 | 1.4 | 79° C. |
| 7X-D | 0.003 | 12600 | 1.2 | 81° C. |

EXAMPLE 8

An additional premixed powder blend of matrix components was prepared as in Example 1A using substantially the same combination of ingredients shown therein except that 0.5 part of an additional lubricant (a polyethylene wax with a melting point of about 125° C.) and 0.5 part of an additional acrylic resin processing aid (ACRYLOID K-175 from Rohm & Haas) were also included.

About 200 parts by weight of the highly tabular aluminum filler (50 to 1 aspect ratio) of Example 2 was gently mixed with 300 parts by weight of the above matrix premix in a rotating drum at substantially ambient temperatures. The resulting dry blend was then converted into a finished, granular molding composition by melt shear processing of same through a heated horizontal, elongated mixer equipped with a single, multi-bladed, concentric rotary impeller operated at conditions to effect fluxing of the resinous components and disperse the metal filler through the cementitious matrix (with stock temperatures reaching as much as 204° C.) and discharging the metal filled plasticated composition through a suitable pelletizing die.

The finished molding composition was later fabricated into cases for a small electrical instrument by means of a 375 ton Cincinnati Injection Molding Machine. Using injection pressures of somewhat less than 20,000 psi maximum and maximum stock temperatures of from about 204° C. to 210° C., good high speed operation was achieved with production of sound finished parts at cycle times of less than 1 minute.

Sections cut from the finished cases were tested for electrical and mechanical properties with the following results:

| | |
|---|---|
| Electrical Resistivity | 2.3 ohm-cm |
| Flexural Strength | 8200 psi |
| Notched Izod Impact Strength | 1.7 ft. lbs./in. |
| Warpage at High Temperature | Negligible* |

*Based upon exposure of both full and half sections of cases at 80° C. for 48 hours in an air circulation oven.

EXAMPLE 9

Two additional premixed powder blends of matrix components were prepared as in Example 1A using the same formulation of ingredients shown therein except that the MBS Graft Copolymer and the Blending Resin were both omitted in favor of the following amounts of an alloying resin supplied by Hitachi Chemical Co. Ltd. under the designation V6001AV (described as a graft type styrene-acrylonitrile copolymer containing an acrylic elastomer substrate derived primarily from n-butylacrylate).

(1) 37 parts by weight to yield Matrix Premix No. 9H containing about 39% chlorine by weight.

(2) 110 parts by weight to yield Matrix Premix No. 9L containing about 26% chlorine by weight.

Thermoplastic molding compositions containing the highly tabular aluminum filler (aspect ratio of about 50 to 1) of Example 2 were then prepared using the procedure described in said example to combine 200 parts by weight of said filler with 300 parts of:

(1) Matrix Premix No. 9H to produce molding composition 9H-D; and (2) Matrix Premix No. 9L to produce molding composition 9L-D.

As before, ⅛" thick molded specimens of these two molding compositions were prepared, and these were tested not only for electrical and mechanical properties but also for flame resistance in accordance with Underwriter's Laboratory Test Procedure No. 94 with the following results:

| Batch No. | Elect. Resist. (ohm-cm) | Flex. Strgth. (psi) | Izod Impact Strgth. (Notched) (ft-lbs/in) | UL-94 Rating |
|---|---|---|---|---|
| 9H-D | 0.059 | 7950 | 0.5 | V-O* |
| 9L-D | 0.53 | 7480 | 0.8 | V-O** |

*Total time of flaming combustion = about 10 seconds with no dripping or after-glowing of any specimens.
**Total time of flaming combustion = about 35 seconds with no dripping or after-glowing, but one specimen burned for 9.5 seconds upon second ignition.

As shown by the above test results, both of these molded (⅛" thick) compositions passed the V-O rating in U.L. Test Procedure No. 94. However, the inclusion of an additional 25 parts of nonchlorinated polymeric modifier like Hitachi Alloying resin V6001AV to a composition like 9L-D (reducing its chlorine content to about 23% by weight) results in a product ⅛" specimens of which will not consistently pass said V-O rating.

EXAMPLE 10

Using a high intensity powder blending procedure analogous to the Papenmeier Mixer operation described in Example 1A hereof, a premix of matrix components was prepared by combining with 100 parts by weight of the same PVC homopolymer described therein the following set of ingredients:

| Ingredient | Parts by Weight |
|---|---|
| Methyl Tin Mercaptide[8] | 2.0 |
| Calcium Stearate | 1.5 |
| Paraffinic Wax[9] | 1.5 |
| Oxidized Polyethylene Wax[10] | 0.1 |
| Acrylic Resin Processing Aid[2] | 1.5 |
| MBS Graft Copolymer[3] | 20.0 |

-continued

| Ingredient | Parts by Weight |
|---|---|
| Rigid Thermoplastic Blending Resin[4] | 7.0 |

[8]Liquid stabilizer supplied by Cincinnati Milacron Chemicals (now the Advance Div. of Carstab Corp.) under Trade Name ADVASTAB TM-181
[9]Wax XI-165 supplied by American Hoechst
[10]Supplied by Allied Chemical under Trade Name of AC 629A
[2]ACRYLOID K-125 from Rohm & Haas
[3]ACRYLOID KM-611 from Rohm & Haas
[4]BLENDEX 586 from Borg Warner Using substantially the same procedure as in Example 2 except that the two-roll mill was heated to about 177° C., a molding composition was prepared from a dry blend of 300 parts of the above-described matrix premix with 200 parts of the highly tabular aluminum flakes of Example 2 (aspect ratio of about 50) and 4.5 parts of rutile titanium dioxide pigment (grade R101 from DuPont). Tests on specimens compression molded from the molding finished composition revealed the following property values:

| Electrical Resistivity | 0.003 ohm-cm |
|---|---|
| Flexural Strength | 7170 psi |
| Notched Izod Impact Strength | 1.6 ft. lbs./in. |

EXAMPLE 11

A Welex high intensity, powder mixer was employed to prepare a uniformly premixed powder blend of matrix components as specified in the following list together with their respective proportions by weight.

| Ingredient | Parts by Weight |
|---|---|
| PVC Homopolymer Resin[11] | 100.0 |
| Hybrid Thermoplastic Alloying Resin[12] | 104.3 |
| Tribasic Lead Sulfate | 5.0 |
| Lead Stearate | 1.0 |
| Liquid Organophosphite | 0.5 |
| Paraffinic Wax[1] | 1.0 |
| Polyethylene Wax[13] | 0.2 |
| Hydrogenated Castor Oil Base Wax[14] | 2.1 |
| Ethylene Bis-stearamide Wax[15] | 1.0 |
| Calcium Stearate | 2.25 |

[1]Wax 1014 supplied by Boler Patroleum Co.
[11]Suspension type PVC with K value of about 51.
[12]A terpolymer of styrene, maleic anhydride and acrylonitrile containing some butadiene rubber, supplied by Kanegafuchi Chemical Industry Co., Ltd. under the Trade Name KANE ACE MUH P-4300.
[13]Supplied by American Hoechst Corp. under the Trade Name WAX PA-190.
[14]Sold by Associated Lead Inc. under the Trade Name PLASTIFLOW CW-2
[15]Supplied by Advance Div. of Carstab Corp. under the Trade Name ADVAWAX 280F.

In preparing the above specified complete Matrix Premix, a separate powder blend was first made from each of the two major resin components in the following manner:

(I) The PVC resin and both lead compounds were placed in the Welex at ambient temperature and mixed with high speed until the temperature reached about 50° C., at which point the paraffinic wax was added. The polyethylene wax and two-thirds of the calcium stearate were finally introduced only after further mixing brought the temperature to about 80° C. The high speed mixing was continued for a few minutes until a temperature of almost 100° C. was reached, when the resultant PVC-based powder-blend was discharged and cooled.

(II) The hybrid alloying resin and the liquid organophosphite were then placed in the Welex at ambient temperature and mixed at high speed until the temperature rose to about 50° C. The hydrogenated castor oil wax was then added and mixing continued until a temperature of about 70° C. was reached, at which point the bis-stearamide was was introduced. Finally, at a temperature of about 80° C., the remaining one-third of calcium stearate was charged and the high speed mixing terminated when the temperature level had reached about 110° C.

After the alloying resin-based powder blend from (II) had also cooled considerably, it was uniformly incorporated into the PVC-based powder blend from (I) using moderate intensity mixing in the Welex for a few minutes to yield the complete Matrix Premix.

Next, 200 parts by weight of the aluminum flakes (aspect ratio = about 50 to 1) described in Example 2 were distributed through 300 parts of above Matrix Premix powder, and the resultant mixture was milled on a two roll mill at about 166° C. for 5 minutes. Test strips ⅛" thick were then compression molded from the finished aluminum filled composition and tested according to accepted methods with the following averaged results.

| Electrical Resistivity (ohm-cm) | Flexural Strength (psi) | Heat Distort. Temperature at 264 psi | Izod Impact Strgth. (notched) (ft.lbs./in.) |
|---|---|---|---|
| 0.05 | 8200 | 93° C. | 1.33 |

Equally good results are obtained when the hybrid thermoplastic alloying resin (KANE ACE MUH P-4300) in the above composition is replaced by a similar alloying resin sold by the same company under the Trade Name TERALLOY A-10 and which is a butadiene rubber modified terpolymer of styrene, alpha-methyl styrene and acrylonitrile.

In the above examples, it will be obvious that various alternative materials can be substituted and minor amounts of supplemental, relatively inert components can be added in accordance with the general teachings of the present invention presented herein, while still attaining the principal advantages and basic objectives thereof. Accordingly, the scope of patent protection sought hereby is not to be restricted by said specific illustrative examples but rather is to be determined by the claims which follow.

What is claimed is:

1. A flame retardant, thermpolastic molding composition of high electroconductivity comprising between about 12% and about 40% by volume of fine solid, conductive metallic particles of anisometric shape having an aspect ratio of at least 10 to 1 and an average minimum characteristic linear dimension (thickness) of at last about 1 micron but not over about 100 microns, dispersed within a cementitious matrix having a chlorine content of at least about 24% by weight and composed predominantly of thermoplastic resins at least about half of which by weight is made up of vinyl chloride polymers which have a vinyl chloride content of at least about 80% by weight and K values between about 45 and about 70, said cementitious matrix also containing from about 3% to about 15% by weight of a well balanced lubricant/stabilizer combination including at least two different lubricants which are solid at temperatures up to at least 50° C. wherein said stabilizer/lubricant combination includes at least about 1% by weight of waxy lubricant, at least about 1% by weight of fatty acid salts of magnesium, lithium and/or alkaline earth metals and at least about 1% by weight of heat stabilizer compounds of metallic elements from Group IVA or VA of the Periodic Table.

2. A thermoplastic molding composition as in claim 1 wherein the metal content of said metal particles is derived from metals selected from the group consisting of aluminum, copper, magnesium, chromium, tin, nickel, iron and titanium.

3. A molding composition as in claim 1 wherein said cementitious matrix includes about 5% to about 50% by weight thermoplastic resin of polymeric adjuvants which are sufficiently compatible to be readily blended with vinyl chloride polymers by mixing of same during melt plastication thereof.

4. A molding composition as in claim 3 wherein said cementitious matrix includes at least 5% by weight of impact improving polymeric adjuvants which are effective in improving the impact strength of rigid vinyl chloride resins.

5. A molding composition as in claim 6 wherein said impact improving polymeric adjuvants are either copolymers formed by graft-type polymerization of one or more comonomers from vinyl aromatics, acrylate monomers and acrylonitriles in the presence of preformed rubbery backbone polymer, or chlorinated linear polyethylene containing between about 25% and about 50% of combined chlorine by weight.

6. A molding composition as in claim 1 which also includes a total of not more than about 10% by weight of said matrix of various minor additives selected from pigments, inert fillers, liquid plasticizers, liquid lubricants and synergists.

7. A granular, flame retardant, thermoplastic molding composition of high electroconductivity comprising between about 15% and about 35% by volume of anisometric solid particles of conductive metal having an aspect ratio between about 20 to 1 and about 100 to 1 and a characteristic minimum dimension of between about 5 and about 50 microns, which particles are thoroughly dispersed in a cementitious matrix having a chlorine content of at least about 24% by weight and composed predominantly of thermoplastic resins at least about half by weight of which are made up of rigid vinyl chloride resins containing not less than about 85% by weight of vinyl chloride and having K values between about 50 and about 60, said cementitious matrix also containing from about 3% to about 15% by weight of a well balanced lubricant/stabilizer combination including at least two different lubricants which are solid at temperatures up to at least 50° C. wherein said stabilizer/lubricant combination includes at least about 1% by weight of waxy lubricant, at least about 1% by weight of fatty acid salts of magnesium, lithium and/or alkaline earth metals and at least about 1% by weight of heat stabilizer compounds of metallic elements from Group IVA or VA of the Periodic Table.

8. A molding composition as in claim 7 wherein said well balanced lubricant/stabilizer combination includes at least one additive from each of the following groups:
    (A) Waxy lubricants
    (B) Fatty acid salts of magnesium, lithium and/or alkaline earth metals
    (C) Heat stabilizing compounds of Group IVA and/or Group VA metals of the periodic table.

9. A molding composition as in claim 8 wherein said metals in (C) are selected from tin, lead and antimony.

10. A molding composition as in claim 7 wherein more than 50% by weight of said particles is composed of one or more metals from the group consisting of aluminum, copper, magnesium, chromium, tin, nickel, iron and titanium.

11. A molding composition as in claim 10 wherein said particles are composed predominantly of aluminum.

12. A molding composition as in claim 7 wherein said cementitious matrix includes between about 5% and about 40% by weight of a partly elastomeric but predominantly thermoplastic impact improving polymeric adjuvant effective in improving the impact strength of rigid vinyl chloride resins.

13. A process for producing a molding composition as described in claim 1 or 7 wherein essential components of said matrix including the specified lubricants, stabilizer compound, vinyl chloride polymers and other significant polymeric ingredients are premixed into a uniform powder blend without melting or plasticating said vinyl chloride polymers, and the anisometrically shaped, metallic particles are then incorporated into said premixed matrix components by means of a resinous melt shearing and plasticating stage mixing step.

14. A process for producing a molding composition as described in claim 1 or 7 wherein a uniform powder blend of most components of said matrix is prepared while avoiding complete melting or plasticating of said vinyl chloride polymers, and then the anisometrically shaped metallic particles are incorporated into said premixed matrix components during plastication of said vinyl chloride polymers by means of a melt shearing mixing action in a continuous mixer, kneader or extruder.

15. A process for producing a highly conductive, flame retardant molded article from a composition of claim 1 or 7 wherein said molded article is thermoformed by shaping said composition in a mold or forcing it through a die while it is in resinous melt plasticated condition.

16. A finished, highly conductive, flame retardant article produced from a composition of claim 1 or 7 by thermoforming said composition while in a resinous melt plasticated state to impart the desired shape thereto followed by cooling to a solidified, form-stable condition.

* * * * *